United States Patent
Vincent et al.

(10) Patent No.: US 8,149,751 B2
(45) Date of Patent: Apr. 3, 2012

(54) METHOD AND SYSTEM FOR TRANSMITTING/RECEIVING MULTIMEDIA CONTENTS VIA A RADIOCOMMUNICATION NETWORK

(75) Inventors: Paul Vincent, Plaisance du Touch (FR); Gwenaël Le Bodic, Dusseldorf Allemagne (FR); Nicolas Chuberre, Pibrac (FR)

(73) Assignee: Alcatel Lucent, Paris (FR)

(*) Notice: Subject to any disclaimer, the term of this patent is extended or adjusted under 35 U.S.C. 154(b) by 492 days.

(21) Appl. No.: 10/577,731

(22) PCT Filed: Oct. 18, 2004

(86) PCT No.: PCT/FR2004/002662
§ 371 (c)(1),
(2), (4) Date: May 2, 2006

(87) PCT Pub. No.: WO2005/048295
PCT Pub. Date: May 26, 2005

(65) Prior Publication Data
US 2007/0077881 A1  Apr. 5, 2007

(30) Foreign Application Priority Data
Nov. 10, 2003  (FR) .................................... 03 13255

(51) Int. Cl.
*H04H 20/71* (2008.01)
(52) U.S. Cl. .................... 370/312; 370/395.4; 370/390; 725/62; 725/97
(58) Field of Classification Search .............. 370/395.4, 370/390, 312; 725/62, 97
See application file for complete search history.

(56) References Cited

U.S. PATENT DOCUMENTS

| | | | | |
|---|---|---|---|---|
| 5,793,973 A | * | 8/1998 | Birdwell et al. | 709/223 |
| 5,995,092 A | * | 11/1999 | Yuen et al. | 725/40 |
| 6,597,891 B2 | * | 7/2003 | Tantawy et al. | 455/3.05 |
| 6,763,035 B1 | * | 7/2004 | Koskelainen et al. | 370/466 |
| 7,017,188 B1 | * | 3/2006 | Schmeidler et al. | 726/26 |
| 2002/0073205 A1 | * | 6/2002 | Mostafa | 709/227 |
| 2002/0078228 A1 | * | 6/2002 | Kuisma et al. | 709/237 |
| 2002/0126708 A1 | * | 9/2002 | Skog et al. | 370/522 |
| 2003/0065747 A1 | * | 4/2003 | Sakamoto et al. | 709/219 |

(Continued)

FOREIGN PATENT DOCUMENTS
EP   0 964 581 A1 * 12/1999

(Continued)

OTHER PUBLICATIONS
Novak et al. "MMS-Building on the success of SMS" Ericsson Review No. 3, 2001 <http://handwritten.net/mv/papers/2001031.pdf>.*

(Continued)

*Primary Examiner* — Ayaz Sheikh
*Assistant Examiner* — Peter Chau
(74) *Attorney, Agent, or Firm* — Fay Sharpe LLP

(57) ABSTRACT

A method for transmitting/receiving multimedia contents via a radiocommunication network includes a first step of a first server transmitting an identifier specific to a multimedia content over a dedicated point-to-point transmission channel to all terminals registered with the first server as interested in the content, a second step of the first server transmitting to a second server adapted to provide a broadcast content transmission service a request to broadcast a message including the content in its entirety and its identifier, and a third step of the second server broadcasting the message over a broadcast channel.

15 Claims, 2 Drawing Sheets

U.S. PATENT DOCUMENTS

| | | | |
|---|---|---|---|
| 2003/0088873 A1* | 5/2003 | McCoy et al. | 725/63 |
| 2003/0186704 A1* | 10/2003 | Tamura et al. | 455/450 |
| 2004/0029596 A1* | 2/2004 | Kim et al. | 455/458 |
| 2004/0085926 A1* | 5/2004 | Hwang et al. | 370/328 |
| 2004/0131026 A1* | 7/2004 | Kim et al. | 370/328 |
| 2004/0157603 A1* | 8/2004 | Hurtta et al. | 455/434 |
| 2004/0171383 A1* | 9/2004 | Fingerhut et al. | 455/435.1 |
| 2004/0198279 A1* | 10/2004 | Anttila et al. | 455/179.1 |
| 2004/0248561 A1* | 12/2004 | Nykanen et al. | 455/414.2 |
| 2005/0015797 A1* | 1/2005 | Noblecourt et al. | 725/32 |
| 2005/0090235 A1* | 4/2005 | Vermola et al. | 455/414.3 |
| 2005/0097053 A1* | 5/2005 | Aaltonen et al. | 705/51 |
| 2007/0004333 A1* | 1/2007 | Kavanti | 455/3.06 |

FOREIGN PATENT DOCUMENTS

| | | |
|---|---|---|
| WO | WO 03/045064 | 5/2003 |
| WO | WO 03/045064 A1 * | 5/2003 |

OTHER PUBLICATIONS

Novak et al. "MMS-Building on the success fo SMS" Ericsson Review No. 3, 2001 <http://handwritten.net/mv/papers/2001031.pdf>.*

Paila, Toni, "Mobile Internet over IP Data Broadcast", Feb. 23-Mar. 1 2003, IEEE, pp. 19-24.*

* cited by examiner

FIG_1
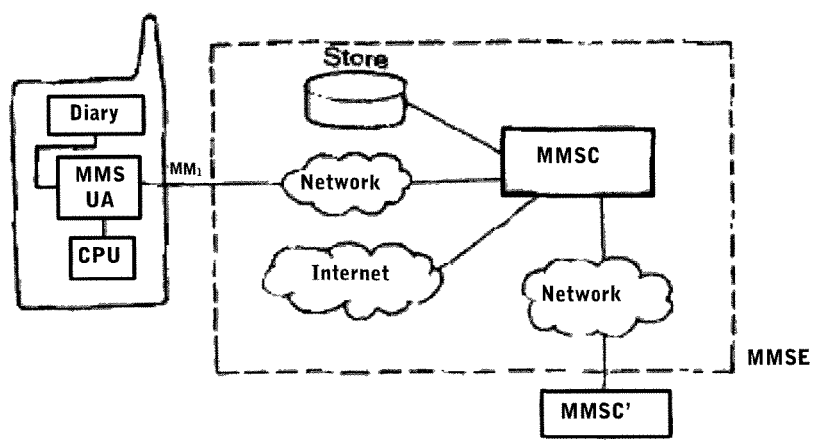
(Prior Art)
FIG_2
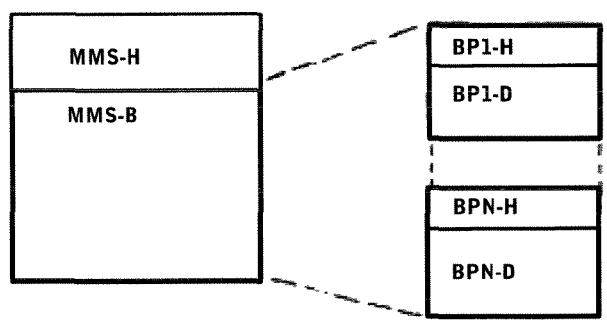
(Prior Art)

FIG_3
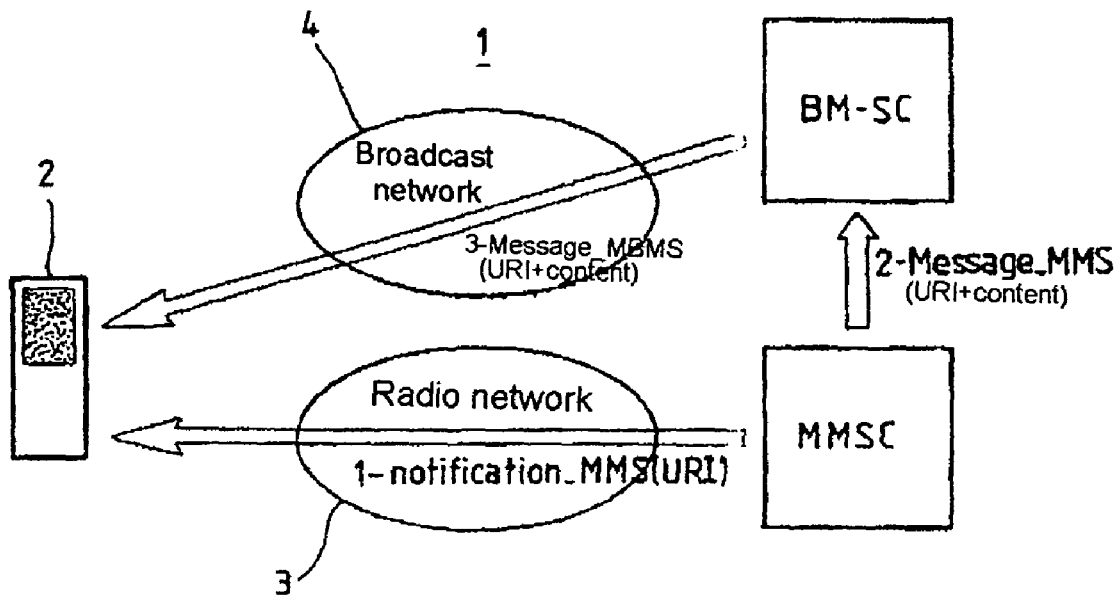
FIG_4
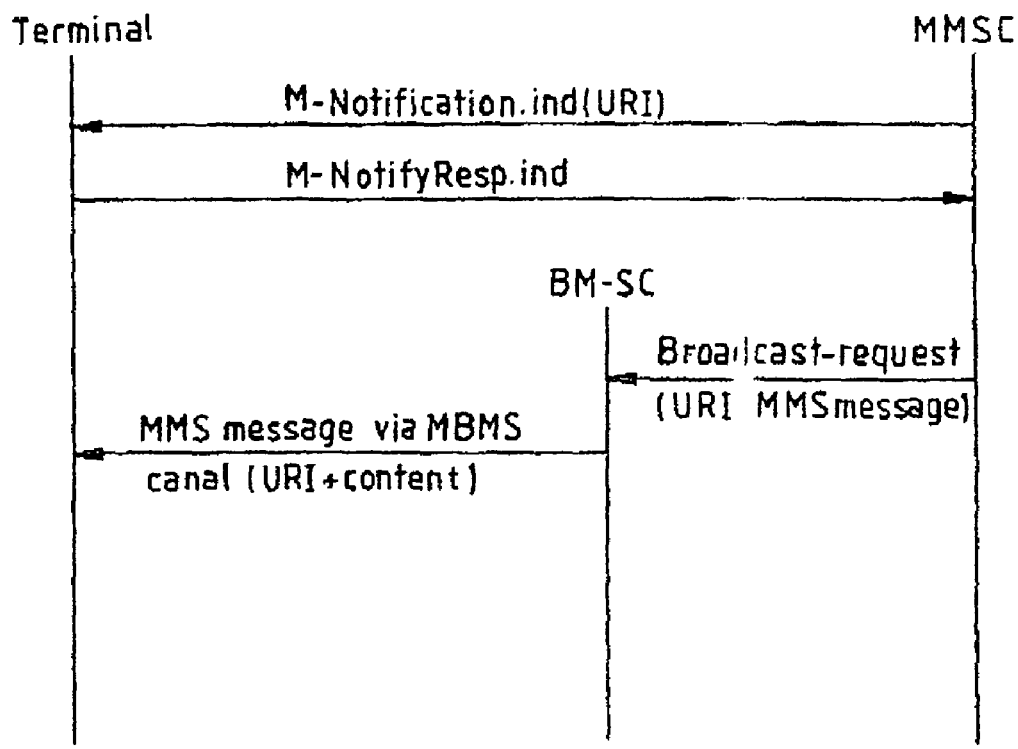

METHOD AND SYSTEM FOR TRANSMITTING/RECEIVING MULTIMEDIA CONTENTS VIA A RADIOCOMMUNICATION NETWORK

CROSS-REFERENCE TO RELATED APPLICATIONS

This application is based on French Patent Application No. 0313255 filed Oct. 11, 2003, the disclosure of which is hereby incorporated by reference thereto in its entirety, and the priority of which is hereby claimed under 35 U.S.C. §119.

BACKGROUND OF THE INVENTION

1. Field of the Invention

The present invention relates to broadcasting multimedia contents to mobile terminals and more particularly mobile telephones in a radiocommunication network.

2. Description of the Prior Art

In most prior art cellular radiocommunication networks a channel specific to each cell, called the cell broadcast channel (CBCH) in the GSM, is used to broadcast generally short information messages to mobile stations in the cell concerned. For clarity, that channel (and equivalent channels in other systems) will be referred to herein as a broadcast channel.

The information is made available to the user of a mobile terminal (for example a mobile telephone) in the form of a text message displayed on the screen of the mobile terminal, sounds, video sequences, or in the form of a voice message if the broadcast channel is a voice channel.

To receive this information, a mobile terminal must monitor the information channel, i.e. be constantly actively receiving that channel. Now it can happen that at certain times no broadcast message is being broadcast over the broadcast channel, for example because there is no new information to be broadcast. Mobile terminals cannot tell that no information will be broadcast at any particular time, and therefore are permanently actively receiving the broadcast channel, sometimes to no useful purpose. The same applies if some of the broadcast information is of no interest to the user of a mobile terminal.

In the case of a mobile telephone, permanently monitoring a channel that may contain no information or no information of interest to its user leads to heavy power consumption. Reducing the power consumption of mobile telephones so that their battery lasts as long as possible between charges is a constant concern. Another problem in this context relates to the radiocommunication network, which nowadays must convey more and more information, which may overload the network. The cost of transmitting these volumes of information can also be prohibitive.

Thus one object of the invention is to provide a broadcasting method enabling mobile terminals to receive only information of interest to them and that does not overload the network to no useful purpose.

SUMMARY OF THE INVENTION

To this end, the present invention proposes a method for a transmission system able to communicate with a radiocommunication network to transmit multimedia contents to a plurality of mobile terminals, the system comprising a first server adapted to provide a point-to-point content transmission service, which method includes the following steps:

a first step of the first server transmitting an identifier specific to a content over a dedicated point-to-point transmission channel to all terminals registered with the first server as interested in the content, a second step of the first server transmitting to a second server adapted to provide a broadcast content transmission service a request to broadcast a message including the content in its entirety and its identifier, and a third step of the second server broadcasting the message over a broadcast channel.

In one embodiment of the invention, in the first step, the identifier is accompanied by a value corresponding to a waiting time prior to reception of the content by the terminals and if the waiting time passes without the terminals receiving the content, the terminal requests to download the content by from the first server via the dedicated point-to-point transmission channel.

In one embodiment of the invention, the broadcast request conforms to the MMS standard and includes an identifier and the content.

The invention also provides a method of reception of multimedia content by a mobile terminal adapted to communicate via a radiocommunication network with a point-to-point content transmission server, the method including the following steps:

a first step of receiving an identifier specific to one or more contents over a dedicated point-to-point transmission channel, and a second step of receiving a message including the content or contents and the identifier over a broadcast channel.

In one embodiment of the method of reception of the invention:

the terminal also receives a decryption key during the first step, and the terminal utilizes the decryption key to decrypt the content during the second step.

The features and advantages of the present invention will become more clearly apparent on reading the following description, which is given by way of illustrative and nonlimiting example and with reference to the appended drawings.

BRIEF DESCRIPTION OF THE DRAWINGS

FIG. 1 is a diagram of a multimedia messaging system (MMS) network architecture.

FIG. 2 is a diagram of the structure of an MMS multimedia message.

FIG. 3 represents one embodiment of the functional architecture of a transmit/receive system of the invention.

FIG. 4 represents the steps of the method of the invention.

DETAILED DESCRIPTION OF THE PREFERRED EMBODIMENT

The growth of multimedia messaging services (MMS) for exchanging multimedia messages follows on from the great success in the field of radiocommunication systems of short messaging services (SMS) and enhanced messaging services (EMS). By offering the possibility of including more and more multimedia data, such as pictures, sound, video sequences, etc. the multimedia messaging service constitutes a development of those types of messaging service. The exchange of MMS messages may be supported by second and third generation radio networks, such as General Packet Radio Service (GPRS) networks and Universal Mobile Telecommunication System (UMTS) networks, for example. What is more, in defining the structure of MMS messages and the mode of exchanging them, multimedia messaging services have taken into account the constraints of interoperability with electronic messaging services via the Internet. A radiocommunication terminal designed to support an MMS messaging service and to operate on a second or third generation network can therefore exchange multimedia messages with terminals connected to the Internet or other types of cable or wireless network.

FIG. 1 is a diagram of the network architecture of a multimedia messaging service.

The MMS architecture requires a network infrastructure able to transport, adapt and store MMS messages and software in the mobile terminals and in the network for composing, sending and receiving MMS messages.

Thus an MMS environment (MMSE) is defined in a given radiocommunication network including a set of network elements under the control of a multimedia message service provider (MMS provider) providing access to the multimedia messaging services as part of a user subscription to said network.

Moreover, a radiocommunication terminal able to exchange MMS messages contains software called the MMS user agent (MMS-UA) that is used to compose, present, send and receive MMS messages. Each MMS-UA sending and receiving an MMS message is attached to an MMSE respectively corresponding to the network subscription domains of the sender and receiver terminals, the send and receive environments possibly being the same. An MMS-UA communicates with the MMSC of its MMSE via a dedicated interface MM1 of said server.

The keystone of the MMS network architecture is the relay server, usually called the MMS center (MMSC), shown in FIG. 1. An MMSC is associated with a given MMSE. The MMSC transports MMS messages in said environment and to other centers MMSC' attached to other MMSE' or to other messaging servers and stores MMS messages pending delivery to a terminal attached to said MMSE. Moreover, the MMSC also adapts the content of MMS messages and maintains subscriber registers and the interface with the invoicing and application systems in respect of services offered to users.

FIG. 2 is a diagram of the structure of an MMS message. A multimedia message generally takes the form of a multipart message that can include non-text elements such as pictures, sound or video sequences to be presented at the same time as reading the message. A multipart MMS message of this kind is then formatted to the Multipurpose Internet Mail Extensions (MIME) format extended by binary encoding for transferring the message over the radio link.

An MMS message conventionally has a header (MMS-H) and a body (MMS-B) that may comprise a plurality of parts known as body parts (BP) each corresponding to one element of the MMS message such as a sound, a picture, etc. The message body MMS-B is therefore made up of a succession of body parts BP each containing a header BP-H indicating the type of element and its size and data BP-D representing the definition of said message element.

The message header MMS-H contains information relating to the transportation of the message, including the identities of the sender, the recipient and recipients of copies, an indication of delivery of the message, and information relating to the message sent, including the sending time and date, the expiry time and date of the message, the reply address, the identification of a message to which it is a reply, the subject of the message, etc.

The header information is organized into fields to which values are assigned.

FIG. 3 shows a multimedia content transmission/reception system 1 of the invention. It includes an MMSC server connected to a broadcast multicast service center (BM-SC) server, a radiocommunication network 3 (which may be of the GPRS or UMTS type), and a broadcast network 4 of the digital video broadcast (DVB), satellite digital multimedia broadcast (S-DMB), etc. type.

The system of the invention further includes a plurality of terminals 2 assigned to respective users interested in the service provided by the MMSC server. The remainder of the description also refers to FIG. 4, which represents the steps of the method executed by the FIG. 3 transmit/receive system.

First of all, the MMSC server sends a point-to-point link notification to the terminals 2. The terminals 2 that receive this notification are those that have indicated their interest in the message and its content (through subscriptions, in the context of a promotional campaign, etc.). This notification sent to the interested terminals 2 could take a form standardized by the MMS standard, such as the notification M-Notification.ind shown in FIG. 4 and in particular including uniform resource identifier (URI) information to serve as a unique identifier for the content message to be received by the terminal. Once the notification has been received, the terminal sends an acknowledgement message M-NotifyResp.ind to the MMSC server.

At this time, the MMSC sends the BM-SC a Broadcast-request message that includes the unique identifier URI and the content message in its entirety. Note further that the BM-SC server is that standardized in the Multimedia Broadcast Multicast System (MBMS) standard drawn up by the 3rd Generation Partnership Project (3GPP).

Following this request from the MMSC server, the BM-SC server broadcasts a message including the unique identifier URI and the content of interest to the users over the broadcast network 4 on a broadcast channel MBMS. A terminal 2 is able to recognize a message of interest to it thanks to the identifier URI in its memory.

In an advantageous embodiment, the URI is accompanied by a value corresponding to a waiting time prior to reception of the content by the terminal 2, and if this waiting time expires without the content being received, the terminal requests to download the content via the MMS channel dedicated to point-to-point transmission. The waiting time parameter is called the Time To Broadcast (TTB), for example.

In an advantageous further embodiment, the terminal 2 also receives a decryption key in the first notification sent by the MMSC and then uses that decryption key to decrypt the content that it receives from the BM-SC.

Thus the present invention is well suited to broadcast systems like the SDMB. It is also easy to implement with very little impact on existing standards like the MMS, necessitating only a minor modification to the onboard software of the terminal and the addition of a broadcast server and transmit/receive means between the two servers. It is also compatible with the terminal power consumption reduction strategy, since the terminal is engaged in point-to-point transmission if it does not receive the expected content within a certain time.

Of course, the invention is not limited to the embodiments described in the present application.

Thus the point-to-point transmission server is applicable to any type of point-to-point connection. The use of the MMS standard is clearly not limiting on the invention, which may be extended to any other connection that can convey the multimedia content. Similarly, the broadcast server is applicable to any type of broadcasting. Note that the concept of broadcasting referred to herein corresponds to the use of a channel that can be "perceived" by all the terminals.

The invention claimed is:

1. A method for a transmission system to transmit multimedia content to a plurality of mobile terminals over a radiocommunication network comprising:
   a first step of a multimedia messaging services center (MMSC) server adapted to provide a point-to-point content transmission service transmitting a multimedia messaging services (MMS)-standardized point-to-point link notification including an identifier specific to a content over a dedicated point-to-point transmission channel to a plurality of mobile terminals, wherein said plurality of mobile terminals registered with said MMSC server as interested in said content prior to said first step;
   a second step of said MMSC server transmitting a broadcast request to a multimedia broadcast multicast system (MBMS) broadcast multicast service center (BM-SC) server adapted to provide a broadcast content transmission service, said broadcast request including said content in its entirety and said identifier; and
   a third step of said BM-SC server broadcasting a message including said content over a broadcast channel.

2. The transmission method according to claim 1, wherein, in said first step, said identifier sent to said plurality of mobile terminals is accompanied by a value corresponding to a waiting time for reception of said content by said plurality of mobile terminals and if said waiting time passes without said plurality of mobile terminals receiving said content, said plurality of mobile terminals requesting to download said content from said MMSC server via said dedicated point-to-point transmission channel.

3. The transmission method according to claim 1, wherein said MMS-standardized point-to-point link notification is M-Notification.ind.

4. The transmission method according to claim 3 further comprising:
   said MMSC server receiving an M-NotifyResp.ind acknowledgement message from said plurality of mobile terminals receiving said M-Notification.ind message.

5. The transmission method according to claim 4 wherein said second step occurs upon receiving said M-NotifyResp.ind acknowledgement messages.

6. The transmission method according to claim 1, wherein said identifier includes uniform resource identifier information serving as a unique identifier.

7. The transmission method according to claim 1, further comprising said MMSC server transmitting a decryption key to said plurality of mobile terminals for use by said plurality of mobile terminals in decrypting said content.

8. The transmission method according to claim 1, wherein said plurality of mobile terminals indicate interest in said content in the context of a promotional campaign.

9. The transmission method according to claim 1, wherein said plurality of mobile terminals indicate interest in said content through subscriptions.

10. A method of reception of multimedia content by mobile terminals adapted to communicate via a radiocommunication network with a point-to-point content transmission multimedia messaging services center (MMSC) server, said method comprising:
    a first step of mobile terminals receiving an identifier specific to a multimedia messaging services (MMS) content from said MMSC server in an MMS-standardized point-to-point link notification over a dedicated point-to-point radiocommunication network transmission channel, wherein said mobile terminals registered with said MMSC server as being interested in said MMS content prior to said first step;
    a second step of said MMSC server transmitting said MMS content in its entirety and said identifier in an MMS broadcast request to a multimedia broadcast multicast system (MBMS) broadcast multicast service center (BM-SC) server adapted to provide a broadcast content transmission service; and
    a third step of said mobile terminals receiving a message from said BM-SC server over a broadcast channel including said MMS content and said identifier.

11. The reception method according to claim 10 further comprising:
    said mobile terminals receiving a decryption key over said dedicated point-to-point radiocommunication network transmission channel; and
    said mobile terminals utilizing said decryption key to decrypt said MMS content.

12. The reception method according to claim 10 further comprising:
    said mobile terminals receiving a value accompanying said identifier corresponding to a waiting time for reception of said MMS content, wherein if said waiting time passes without said mobile terminals receiving said MMS content, said mobile terminals requesting to download said MMS content from said MMSC server via said dedicated point-to-point radiocommunication network transmission channel.

13. The reception method according to claim 10 further comprising:
    said mobile terminals receiving a value accompanying said identifier corresponding to a waiting time for reception of said MMS content, wherein if said waiting time passes without said mobile terminals receiving said content, said mobile terminals requesting to download said MMS content from said MMSC server via said dedicated point-to-point radiocommunication network transmission channel.

14. The reception method according to claim 10, wherein said plurality of mobile terminals indicate interest in said content in the context of a promotional campaign.

15. The reception method according to claim 10, wherein said plurality of mobile terminals indicate interest in said content through subscriptions.

* * * * *